R. H. CARR & J. C. MADDUX.
SHOCK ABSORBER.
APPLICATION FILED FEB. 26, 1914.

1,102,644.

Patented July 7, 1914.

Inventors
R. H. CARR and
J. C. MADDUX

Witnesses

By Watson E. Coleman
Attorney

UNITED STATES PATENT OFFICE.

RAYMOND H. CARR AND JOHN C. MADDUX, OF KINGMAN, ARIZONA, ASSIGNORS OF ONE-FOURTH TO SAID CARR, ONE-HALF TO SAID MADDUX, AND ONE-FOURTH TO ALVAH JOHN McKELVEY, OF KINGMAN, ARIZONA.

SHOCK-ABSORBER.

1,102,644.      Specification of Letters Patent.      Patented July 7, 1914.

Application filed February 26, 1914. Serial No. 821,255.

*To all whom it may concern:*

Be it known that we, RAYMOND H. CARR and JOHN C. MADDUX, citizens of the United States, residing at Kingman, in the county of Mohave and State of Arizona, have invented certain new and useful Improvements in Shock-Absorbers, of which the following is a specification, reference being had to the accompanying drawings.

This invention comprehends certain new and useful improvements in shock absorbers for automobiles and similar vehicles, of the type of devices that are in the nature of auxiliary springs, designed to add to the easy riding qualities of the car to which they are applied and to thus promote the comfort of the occupants as well as to increase the serviceability of the vehicle.

The invention has for its primary object a simple, durable and efficient construction of device of this character, which will be composed of few parts that may be very cheaply and easily manufactured and readily assembled and which will not be liable to get out of order. And the invention also aims to generally improve devices of this character so as to render them more useful and commercially desirable.

With the above and other objects in view, as will more fully appear as the description proceeds, the invention consists in certain constructions, arrangements and combination of the parts that we shall hereinafter fully describe and claim.

For a full understanding of the invention, reference is to be had to the following description and accompanying drawing, in which—

Figure 1:
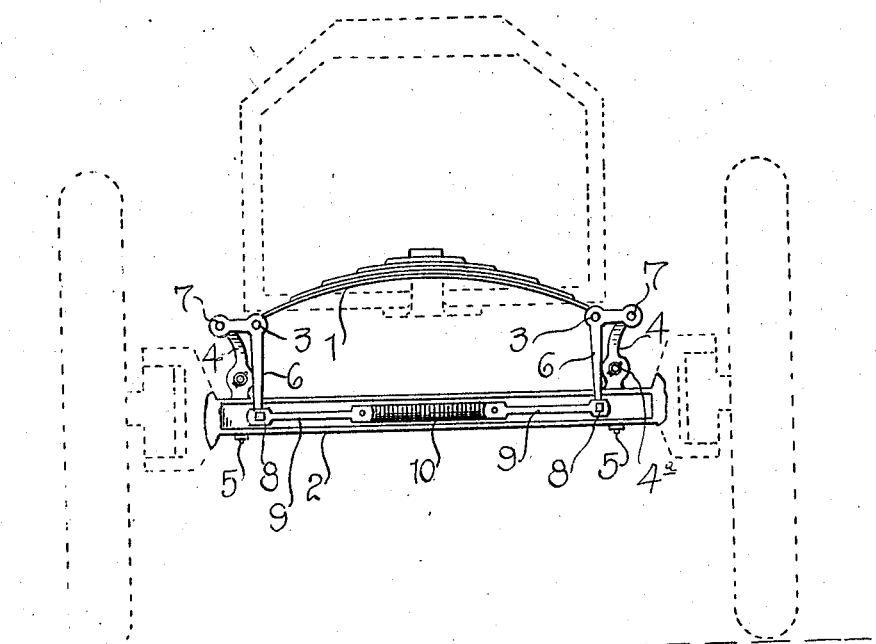
Figure 2:
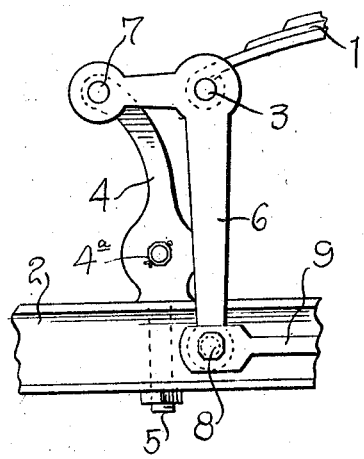

Figure 1 is an end elevation of an automobile having our invention applied thereto, the automobile being shown in dotted lines and being of conventional form. Fig. 2 is an enlarged fragmentary view of the device.

Corresponding and like parts are referred to in the following description and designated in all of the views of the accompanying drawing by like reference characters.

Referring to the drawing, the numeral 1 designates one of the springs of an automobile, the same being connected to the body of the vehicle in any desired way, and 2 designates the sub-jacent axle. Each of these elements may be of any desired construction or design, the lowermost leaf of the spring 1 being coiled at its ends, in the usual manner, to receive the coupling pin or bolt 3.

In carrying out our invention, we mount upright posts 4 upon the axle 2, said posts being two in number and spaced laterally from each other. These posts may be secured to the axle in any desired way, being shown in the present instance as provided with shanks or stems 5 which extend through the axle and are secured in place by nuts screwed on their lower ends, shoulders being formed at the juncture of the main or body portions of the posts with the shanks, so as to rest firmly upon the upper edge of the axle, as clearly illustrated in the drawing.

Angular or inverted L-shaped levers 6 are pivotally supported at one extremity, as at 7, on the upper ends of the respective posts 4 and are pivotally connected at their elbows to the ends of the spring 1, preferably by the pins or bolts 3. The normally vertical arms of the levers 6 extend downwardly from the spring and are pivotally connected at their lower extremities, as at 8, with link rods 9. These rods 9 extend along the axle, as shown and are joined together at their inner or adjacent ends by means of a contractile coiled spring 10.

From the foregoing description in connection with the accompanying drawing, the operation of our improved shock absorber will be apparent. When a load is imposed upon the body of the vehicle, or when the wheels strike an obstruction in the road, the yielding of the main spring 1 will manifestly be accompanied by a rocking or tilting movement of the angular levers 6 about their fulcrum points 7 and this movement will obviously stretch or expand the contractile spring 10 whereby this spring will serve as an auxiliary to the main spring and shocks and jars will be effectually absorbed.

It will be seen that we have provided a very simple, durable and efficient construction of this character, which is composed of very few parts and which parts may be readily applied to any vehicle and assembled together.

While the accompanying drawing illustrates what we believe to be the preferred embodiment of our invention, it is to me understood that the invention is not limited thereto, but that various changes may be made in the construction, arrangements and proportions of the parts without departing from the scope of the invention, as defined in the appended claims.

For some makes of cars, the posts 4 are apertured to receive the radius rods, nuts 4ª screwing thereon, as clearly illustrated in the drawing so as to secure the rods in place. When our invention is applied to the car, the tension of the coil spring 10 will pull the levers 6 nearer together at the bottom in order to clear the radius rod in the post.

What we claim, is:

1. In a vehicle and in combination with the body spring and axle thereof, angular levers pivotally supported upon the axle at one end and pivotally connected at their elbows to the body spring, and a contractile spring operatively connected to the other end of said levers and tending to draw the same together.

2. In a vehicle and in combination with the body spring and axle thereof, posts connected to the axle, and extending upwardly therefrom, angular levers fulcrumed at one end on the upper end of said posts and pivotally connected to the body spring at their elbows, link rods pivotally connected to the other extremity of said levers, and a contractile spring operatively connected to said link rods tending to draw the same together.

In testimony whereof we hereunto affix our signatures in the presence of two witnesses.

RAYMOND H. CARR.
JOHN C. MADDUX.

Witnesses:
E. O. SHAW,
HENRY E. LANG.

Copies of this patent may be obtained for five cents each, by addressing the "Commissioner of Patents, Washington, D. C."